May 23, 1939.   E. PENKALA   2,159,290
ROLLERS FOR USE IN PRODUCING PROFILED SECTIONS FROM SHEET METAL
Filed June 19, 1937   2 Sheets-Sheet 1

Inventor:
Emil Penkala
By Potter, Pierce & Scheffler,
Attorneys.

May 23, 1939.　　　　　　E. PENKALA　　　　　　2,159,290
ROLLERS FOR USE IN PRODUCING PROFILED SECTIONS FROM SHEET METAL
Filed June 19, 1937　　　　2 Sheets-Sheet 2
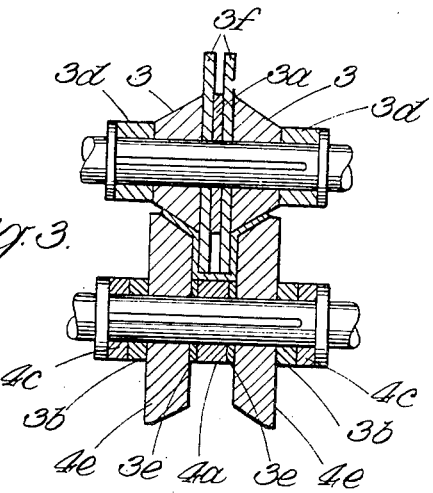
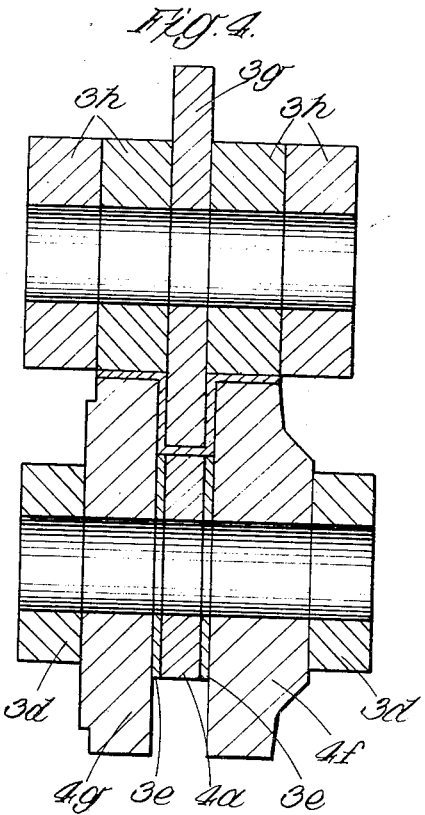
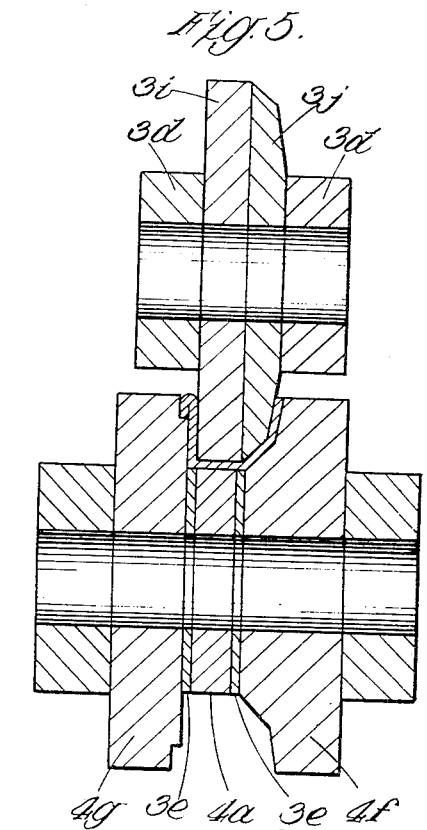
Inventor:
Emil Penkala
By Potter, Pierce & Scheffler,
Attorneys.

Patented May 23, 1939

2,159,290

UNITED STATES PATENT OFFICE 2,159,290

ROLLERS FOR USE IN PRODUCING PROFILED SECTIONS FROM SHEET METAL

Emil Penkala, London, England, assignor to Metal Trim Limited, London, England, a British company Application June 19, 1937, Serial No. 149,219
In Great Britain January 26, 1937

3 Claims. (Cl. 153—28)

This invention relates to rollers for use in producing profiled sections from sheet metal, and has for its object to enable a large number of profiled sections varying in shape as well as in dimensions to be produced by the use of a comparatively small number of stock rollers and roller parts.

Heretofore every different profiled section involved a different set of rollers and thus to produce a wide range of sections it was necessary to have a very large and expensive stock of rollers.

According to the present invention, a profile roller for use in the production of profiled sections from sheet metal is constructed of or provided with interchangeable parts adapted to be assembled on a roller spindle in various combinations to provide different profiles and sectional dimensions.

The invention also includes a profile roller having the whole or part of the profile formed of separate annular parts interchangeable with one another and/or with other parts of different shape and/or dimensions.

Certain of the aforesaid interchangeable parts may be differently shaped at opposite sides and may be reversible so that one part may be employed in combination with other suitable parts for the production of at least two differently shaped profiled sections.

Furthermore, a part or parts of the roller co-operating with the wall or walls of the profiled section may be built up of rings of different diameter arranged so that the pressure on the section is localised on parts of the section not subject to longitudinal or lateral stretching in accordance with my co-pending application Ser. No. 149,217, filed June 19, 1937.

The interchangeable parts, together with bearings for the roller, may be assembled on the roller spindle and clamped up together by means of nuts engaging a screw-threaded portion at one end of the spindle, the said bearings being movable on the spindle so as to form distance pieces.

The interchangeable parts may be suitably shouldered or flanged so as to interlock with one another when assembled.

The invention is hereinafter described by way of example with reference to the accompanying diagrammatic drawings, in which:

Figure 3 is a view similar to Figure 1 showing how, by the use of two additional parts, the parts shown in Figure 1 may be employed to form rollers for one stage in the profiling of a flanged channel section;

Figure 4 shows a built-up roller for finishing a section such as that shown in Figure 3; and Figure 5 shows how, by reversing certain of the parts used in Figure 4, a different profile may be obtained.

In carrying the invention into effect according to a preferred embodiment and with reference to the accompanying diagrammatic drawings, the profile rollers are built up on standard spindles 1, 2 which are interchangeable.

Figure 1:
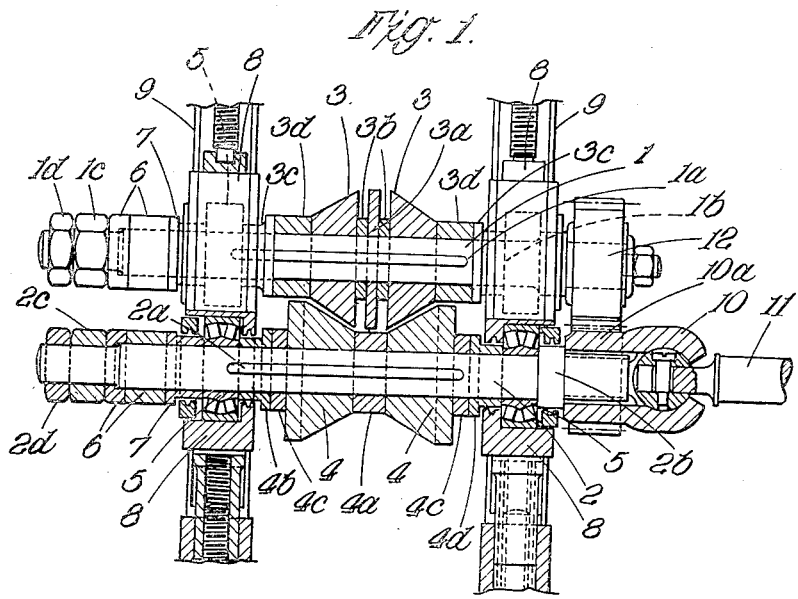
Figure 1 is a part cross-section illustrating a pair of profile rollers constructed in accordance with the present invention and adapted to perform the first operation in the forming of a U section.

As shown in Figure 1, the upper roller comprises two truncated conical parts 3 and a central disc 3a spaced apart by intermediate ring members 3b. The parts 3 are located between collars 3c by the provision of suitable distance pieces 3d.

The lower roller comprises two truncated conical parts 4 spaced apart by an intermediate member 4a and located between collars 4b by the provision of suitable distance pieces 4c preferably constituted by roller sections of suitable diameter.

The interchangeable parts are formed with keyways to engage the keys 1a, 2a on the respective spindles 1, 2.

In assembling the rollers one of the roller bearings 5 is threaded on to the spindle so as to abut the shoulder 1b or 2b. The parts hereinbefore referred to are then applied in the proper order followed by the other bearing 5 and an outer collar 7 and suitable distance pieces 6. The bearings 5 being slidable on the spindle constitute distance pieces and thus the whole assembly may be tightened up against the shoulder 1b or 2b by means of a nut 1c or 2c engaging a screw-threaded portion at the end of the respective spindle 1, 2, whereafter a lock nut 1d or 2d is tightened up to secure the assembly 4.

Thus the built-up roller, the roller bearings 5 and their housings 8 form a unitary assembly capable of being readily positioned in the pedestals 9 or like means in which the rollers are supported on the profiling machine.

By using the parts 3a, 3b of different diameter intermediate the parts 3, the application of the rolling pressure may be localised on desired parts of the section not subject to longitudinal or lateral stretching during the profiling operation.

Figure 2:
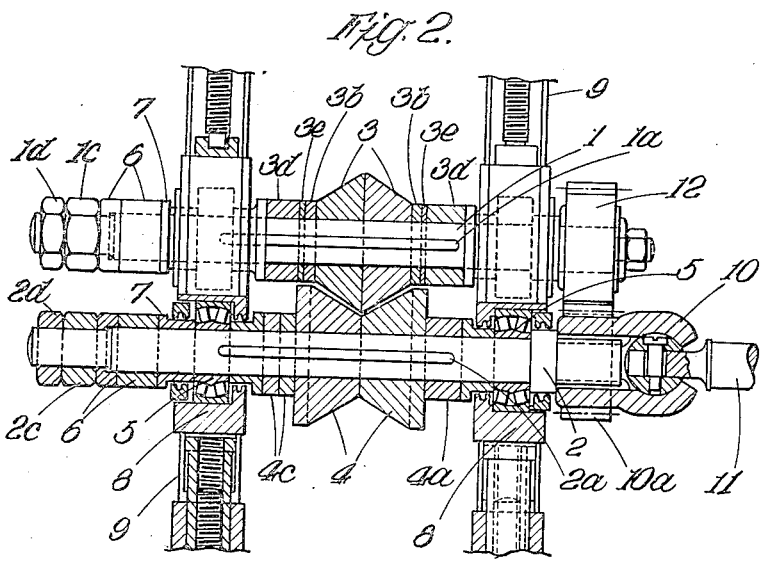
Figure 2 is a similar view showing how the same interchangeable parts may be employed to build up profile rollers suitable for performing the first operation in the shaping of an L section.

As shown in Figure 2, the same parts, with the omission of the disc 3a and the addition of two washers 3e, may be used to build up profile rollers for rolling an L section. It will be seen that according to Figure 2 the two ring members 3b are disposed at the outer sides of the parts 3 while the member 4a in the lower roller assembly is disposed at the outer side of one of the parts 4 and the two spacers 4c are disposed together at the outer side of the other member 4.

A suitable universal coupling member is applied upon the end of the spindle 2 for the transmission of drive by means of a shaft 11 and such coupling member may have a driving gear formed therein for engagement with a gear 12 on the upper spindle 1.

It will be understood that by the use of the same interchangeable parts, for instance as shown in Figures 1 and 2, in conjunction with spacers of varying dimensions, profile rollers for rolling U or L sections of various sizes may be readily built up. As shown in Figure 3 the same parts as in Figure 1, with the addition of parts 3e, 3f and 4e and the omission of parts 4 and 4b, are utilised to build up rollers for use in one stage in the formation of a flanged U section.

The same principles are applied to the production of more complicated sections, in which case certain of the interchangeable parts may be differently shaped at opposite sides and may be reversible so that any one of such parts may be employed in combination with other suitable parts or distance pieces for the production of at least two differently shaped profile sections. For example, as shown in Figure 4, the rollers for finishing the section shown in Figure 3 may comprise the parts 3g, 3h, 3d, 3e, 4a, 4f and 4g. By reversing the parts 4f and 4g, and using a different upper roller assembly comprising the parts 3d, 3i and 3j, as shown in Figure 5, an entirely different profile is obtained.

It will be understood that the invention is not limited to the particular embodiment hereinbefore described. For example, it is within the scope of the invention to assemble the interchangeable parts on a sleeve or sleeves which thereafter is or are threaded on the spindle and clamped in position thereon by suitable means.

What I claim and desire to secure by Letters Patent is:

1. A profile roller assembly and mounting comprising a roller spindle having a longitudinal key, a roll structure comprising a plurality of axially removable and interchangeable profiling segments slidable onto the spindle, spaced bearings each movable axially of the spindle, distance pieces adjacent the bearings and slidable axially of the spindle, and clamping means adjacent the spindle ends to draw said segments and bearings and distance pieces together as a unit on the spindle, and adjustable spaced upright pedestals supporting said bearings.

2. A profile roller assembly and mounting comprising a roller spindle having a fixed abutment in the form of a collar adjacent one end and a screw threaded portion at its other end, an anti-friction bearing having its inner race engaging the inner side of said abutment, a multi-section roll structure of variable size and shape slidable axially of the spindle body and having one end engaging said inner race, a second anti-friction bearing slidable on said spindle and having its inner race disposed in contact with the other end of said roll structure, clamping means including a screw threaded element engaging said threaded portion of the spindle to tighten all of the enumerated parts together as a unit assembly, and adjustable supports detachably carrying the outer races of said bearings.

3. In the assembly defined in claim 2, the first mentioned inner race being threaded on said spindle adjacent said abutment, and said spindle carrying a longitudinal key extending through at least a part of said roll structure and slidable into the second mentioned inner race.

EMIL PENKALA.

CERTIFICATE OF CORRECTION.

Patent No. 2,159,290. May 23, 1939.

EMIL PENKALA.

It is hereby certified that the above numbered patent was erroneously issued to "Metal Trim Limited" as assignee of the entire interest therein whereas said patent should have been issued to --Emil Penkala, of London, England, assignor of one-half interest to Metal Trim Limited, of London, England, a British company, as shown by the record of assignments in this office; and that the said Letters Patent should be read with this correction therein that the same may conform to the record of the case in the Patent Office.

Signed and sealed this 16th day of October, A. D. 1945.

Leslie Frazer (Seal) First Assistant Commissioner of Patents.